Nov. 7, 1961 W. R. YOUNG, JR 3,008,004

SPIRAL ERROR CHECKING METHOD

Filed May 25, 1959 4 Sheets-Sheet 1

INVENTOR
W. R. YOUNG, JR.
BY J. P. Kearns, Jr.
ATTORNEY

Nov. 7, 1961 W. R. YOUNG, JR 3,008,004

SPIRAL ERROR CHECKING METHOD

Filed May 25, 1959 4 Sheets-Sheet 2

INVENTOR
W. R. YOUNG, JR.
BY
J. P. Kearns, Jr.
ATTORNEY

SPIRAL ERROR CHECKING METHOD

Filed May 25, 1959

4 Sheets-Sheet 3

INVENTOR
W. R. YOUNG, JR.
BY J. P. Kearns, Jr.
ATTORNEY

INVENTOR
W. R. YOUNG, JR.
BY J. P. Kearns, Jr.
ATTORNEY

United States Patent Office 3,008,004
Patented Nov. 7, 1961

3,008,004
SPIRAL ERROR CHECKING METHOD
William R. Young, Jr., Summit, N.J., assignor to Bell Telephone Laboratories, Incorporated, New York, N.Y., a corporation of New York
Filed May 25, 1959, Ser. No. 815,712
1 Claim. (Cl. 178—23)

This invention relates to teletypewriter systems in general and specifically to a method of error detection in such systems.

The need for low error rates and error detection methods for land-line teletypewriter transmission systems is increasing daily with the use of such systems for the transmission of digital data. An error rate which may be tolerable for plain message text, where the redundancy is such that the recipient can in most cases supply the needed correction from the context, becomes intolerable for numerals and other material which do not constitute readable text. This is particularly so where the teletypewriter circuit serves as a link between input equipment and a remotely located computer, for example.

By far the greatest proportion of land-line teletypewriter equipment is designed to handle messages encoded in the five-unit Baudot code. While there exist error detecting and correcting codes, such as the seven-unit codes with a fixed ratio of marking to spacing elements used in radiotelegraph systems, it is particularly desirable to have an error-checking method which is compatible with the five-unit code and which has a high level of accuracy and at the same time a lower degree of redundancy than the multiple unit codes heretofore employed.

It is therefore a principal object of this invention to detect errors introduced by transmission equipment into a teletypewriter message with a minimum of redundancy and a high probability that errors will be detected.

It is another object of this invention to minimize line time required to detect errors in transmission.

It is still another object to detect errors in teletypewriter transmission systems in a manner which is compatible with existing equipment.

It is yet another object to effect an economical solution to the problem of detecting errors in a teletypewriter transmission system.

It is known in the prior art to generate an error check character for short blocks of eight or ten characters of a teletypewriter message by a separate count of the marks occurring on each of the five signal levels at both sending and receiving stations. The check character transmitted from the sending station is compared with that generated at the receiving station and any discrepancy between them is taken as an indication of the presence of an error. In such a prior art method an even number of errors on a given signal level would go undetected were special remedial steps not taken. Therefore, in accordance with this invention the count level is shifted between characters from one level to another. If this shifting occurs a constant number of levels between characters, there results what might be termed a "spiral error check." In this way the detection of errors that tend to recur on the same level due to a malfunction of certain equipment parts is facilitated. Inasmuch as the spiral method of error checking increases the probability of detecting such double errors because the count returns to a given level only on every fifth character, the error count may be extended over a full line of characters, which may be as high as 74 per line. Also, in accordance with this invention the shifting of levels between characters may be performed either in a more random fashion or according to a predetermined program.

Additional advantages and objects of this invention will become apparent from a consideration of the following description together with the drawings in which.

Figure 1:
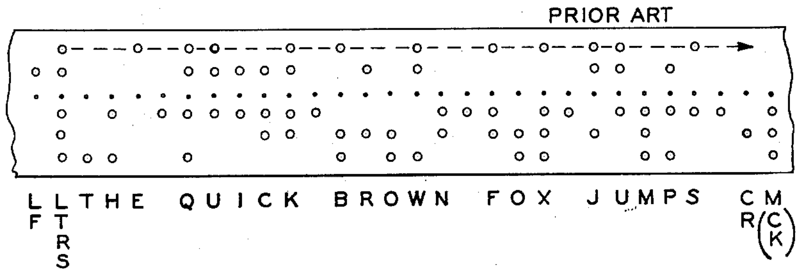
FIG. 1 represents a section of teletypewriter perforated tape containing a sample message and a check character generated in accordance with a prior art method by counting marks on each horizontal code level.

FIG. 1 shows a portion of a teletypewriter perforated tape having encoded thereon in the five-unit Baudot code the message indicated. There are five code levels indicated plus a row of feed holes. A check character is developed by counting the number of marks (punched holes) in each horizontal level on the tape between the line feed function character at the beginning of the message line and the carriage-return function character at the end of the message line. The dashed line on the first level indicates that one count is made on that level. For each level the check character includes a marking hole where an odd number of marks is present and a blank (no hole) where an even number of marks is counted. In the example shown the check character is the letter M. It will be recognized, of course, that this choice is purely arbitrary and the absence of a hole could as well indicate an odd number of marks on a given level. Whichever convention is chosen, counters at both transmitter and receiver are assumed to be aligned accordingly.

It should be noted here that the prior art horizontal count represented here would not normally be carried out over a message block as long as shown in FIG. 1 because of the likelihood of not detecting double errors of the type mentioned above. A check character would likely have been formed every other five letter word in the message.

Between the carriage-return function character at the end of one line of the message and the line-feed character at the beginning of the next line this check character is transmitted. At the receiver a similar odd-even count is made and when the transmitted check character is received, it is compared at the receiver with the check character there developed. A direct comparison is made and an alarm given if the two check characters fail to agree. It may be arranged that the alarm or indication of error is only momentary or that the transmission be stopped until some manual or automatic corrective action be taken. For example, it may be arranged that some error indicating mark be placed on the message tape or printed page. In this event continuous transmission irrespective of errors may be desired. Manual action may be taken by sending a service message to the sending station to have the erroneous message line repeated. Alternatively, a signal may be arranged to cause automatic retransmission of the incorrectly received message line. In some cases, where, for example, switching centers are located between terminal stations, it may be impossible to signal back to the transmitting terminal automatically. On the other hand, if no error is present, transmission may resume in the normal manner. A print-suppression action may also be taken so that the check character will not be printed or punched in the received message.

It is known that certain troubles with transmission apparatus, such as dirt on one of the contacts of the transmitter distributor, tend to cause multiple errors on a given code level, and if these troubles should occur an even number of times on a given level, it is apparent that the error will go undetected. Therefore, in accordance with this invention, it is proposed that the level at which successive marking counts are made be shifted between each character.

Figure 2:
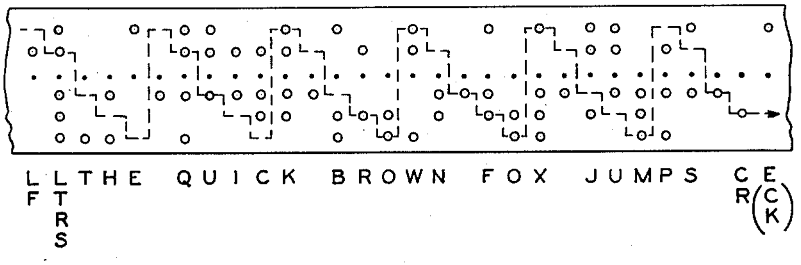
FIG. 2 represents the same teletypewriter perforated tape as in FIG. 1 with a check character generated, in accordance with the principles of this invention, by counting marks according to a spiral shift in levels between characters.

FIG. 2 shows a section of perforated tape containing the same message as that shown in FIG. 1, but with a check character developed by adding marks from successive levels character-by-character. A different check character, the letter E, results as shown at the end of the line. This check character is generated by counting, as shown by the path traced by the dashed line, the mark on the first level of the first character, the mark on the second level of the second character, the mark on the third level of the third character, and so forth. All five levels are counted simultaneously in this manner, a single path only being shown on the drawing. This may be regarded as a spiral shift of the count between characters. Thus, it is seen that the probability of catching an error of the type already mentioned which may tend to occur an even number of times on a given level is increased, while the redundancy represented by the generation and transmission of the check character remains the same. In actual practice the redundancy is further lessened because the count is extended over a longer block of characters.

It is apparent that the redundancy in an error detection system according to this invention is far below that in a six-, seven-, or eight-unit code which represents 15 percent or more redundancy in each coded character. Up to 74 characters per line are possible in the conventional teletypewriter page printed line, and adding a single check character for this line inserts a redundancy of less than 2 percent. Furthermore, the error detection method of this invention is compatible with existing teletypewriter apparatus designed for the five-unit code. It is evident that the spiral shift may be made by shifting any uniform number of levels between characters other than one.

Figure 3:
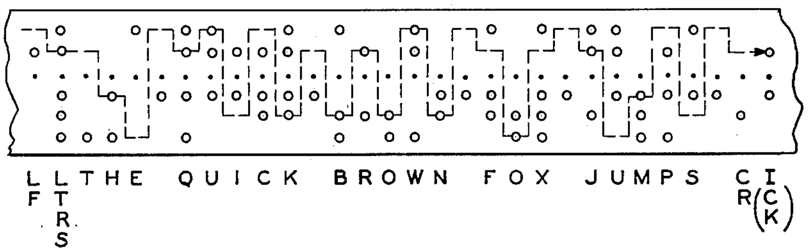
FIG. 3 represents the same teletypewriter perforated tape as in FIG. 1 with a check character generated, in accordance with further principles of this invention, by counting marks according to a random shift in levels between characters.

FIG. 3 shows a teletypewriter message tape containing the same message as shown in FIGS. 1 and 2, but having the check character developed by a shifting scheme of a random nature. Rather than shift a uniform number of levels between characters as indicated in FIG. 2, it may be desirable in some cases to shift in a more random fashion. FIG. 3 indicates the shift pattern resulting when the levels of shift are determined by the number of marks in the preceding character. This shift pattern is more general than the uniform spiral shift and, in some cases, an increase in accuracy may result. A different check character, the letter I, is obtained as shown. The shift might be arranged to operate in both directions also so that no more than a shift of two levels in either direction would be necessary. A predetermined programmed shift pattern could also be built into the transmitter and receiver.

Figure 4:
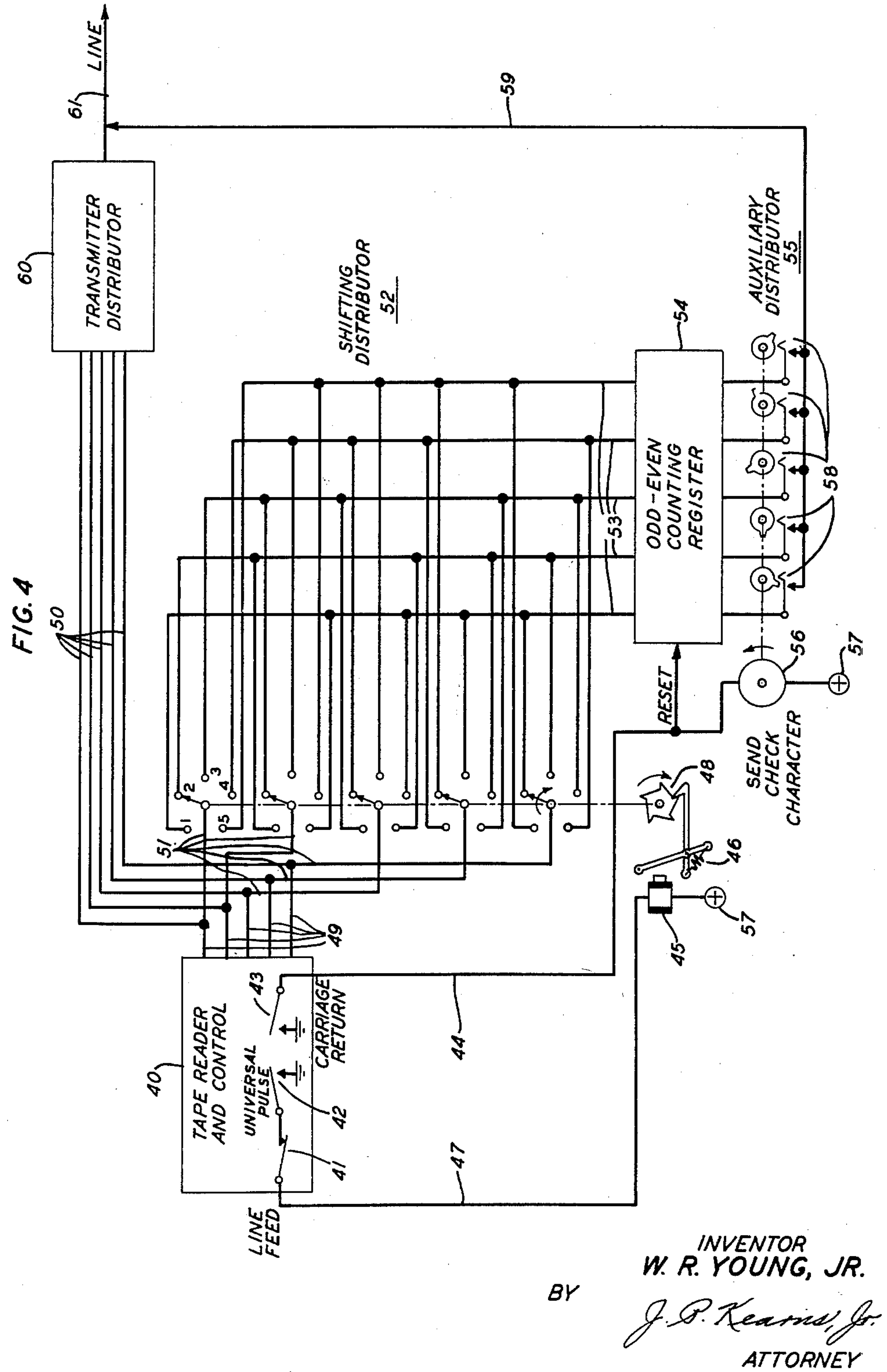
FIG. 4 shows a simplified system in block schematic form for implementing the spiral shift method at the sending end of a teletypewriter transmission system.

FIG. 4 depicts an illustrative embodiment of an apparatus located at a transmitting station for generating an error check character by the uniform spiral method. Blocks 40 and 60 represent conventional sending equipment found in a teletypewriter console. Tape reader and control 40 include the sensing fingers for punched tape together with sequence control apparatus, commonly known as the stunt box, for advancing the tape, controlling page printers, recognizing address and message codes and the like. Reader 40 may also include keyboard equipment. Transmitter-distributor 60 may be a conventional rotary distributor for converting the parallel five-unit code into a series of marks and spaces for transmission over a single line such as line 61 to a receiving station. Reader 40 and distributor 60 are interconnected by parallel leads 49 and 50.

The remainder of FIG. 4 represents auxiliary apparatus for practicing the spiral error check method of this invention. Marking and spacing pulses from the output of reader 40 are taken over leads 51 to the brushes of a five-bank shifting distributor 52. Each bank of distributor 52 includes five equally spaced sets of contacts which are engaged one at a time by the associated brush. Five output leads are provided from each bank of the distributor 52. These output leads are in turn connected matrix fashion through the five input leads 53 to an odd-even counting register 54.

Counting register 54 may comprises a group of five two-state registration devices of any well known form. For example, each registration device may be a relay flip-flop, an Eccles-Jordan electron tube flip-flop, or a transistorized version of the latter. Each marking impulse impressed on one of the flip-flops changes the flip-flop, the second resets it, and so forth. At the end of a registration cycle a flip-flop in the set state therefore indicates the receipt of an odd number of marking impulses. The converse is true if an even number of marking impulses has been registered. This, of course, assumes that before registration begins all flip-flops have been reset to the off-state. It is obvious that the on-state of the flip-flops could have been adopted as the reset condition. In either event it is only necessary that the same convention be observed at both transmitting and receiving stations.

The brushes on shifting distributor 52 are arranged to be stepped one position between each character by means of a ratchet and pawl mechanism 48. The stunt box portion of control 40 provides function character recognition equipment. For example, line feed contact 41 closes upon recognition of the line feed function character indicating the start of a message line, and is here assumed to remain closed until the carriage-return character is sensed; universal pulse contacts 42 close momentarily for each message character containing at least one marking element (a Blank character will not cause a spiral shift); and the carriage-return contacts 43 close at the end of a message line. The operation of the stunt box is well known in the art and will not further be described here.

Mechanism 48 is actuated by linkage 46 upon operation of relay 45, the operating coil of which is connected to battery 57 at one end and to ground over line 47 through line feed contact 41 and universal pulse contact 42. Line feed contact 41 is held closed during the transmission of a line of message text and universal contact 42 closes after each character, as previously mentioned. Thus, relay 45 is operated once for each message character other than a blank and shifting distributor 52 is rotated one step clockwise for each message character.

Assuming that the counting register 54 is reset to the off-state at the start of a message line and that the brushes of distributor 52 are resting on positions 1, code levels one through five of the output of reader 40 will be connected in order to the five flip-flops in register 54. Marks in the first coded message character are then counted in register 54. Universal contact 42 operates to step the brushes of distributor 52 to the second contact positions. Code levels one through five are now connected to flip-flops two through one and marks in the second coded message character are added to the previously counted marks of the first message character, but shifted one place to the right. At the end of the second charatcer contact 42 again closes to step distributor 52 to the third position. This sequence of count and step continues until the end of the message line when the carriage-return contact 43 is closed and line feed contact 41 is opened. The count standing in the register is the check character. It may be any code combination, such as, the letter O shown in FIG. 2.

In order to read out the count standing in register 54 auxiliary distributor 55 is connected between register 54 and outgoing line 61 by means of lead 59. Auxiliary distributor 55 is connected between register 54 and outgoing line 61 by means of lead 59. Auxiliary distributor 55 may comprise a bank of cams 58 driven by a motor 56. Each cam has a single projection on its periphery so that upon operation of the motor the associated contacts close in sequence to apply the check character to the line. Motor 56 is controlled by carriage-return contact 43, which functions at the end of each message line. Contact 43 also resets the counting register after the transmission of the check character. A suitable delay is assumed before the reset is effective to clear the register after the check character has been transmitted. Further provision may be made so that motor 56 performs only one rotation at the end of a massage line. This may be accomplished in any well known manner such as by providing an additional cam-operated switch in series with the motor. Additionally, an arrangement (not shown) may be made to reset distributor 52 to the first position in preparation for counting the marks in the next message line. For each successive line of the message a new check character is formed in the manner described above. It is evident that the length of the line is immaterial. A check character is transmitted whenever the carriage-return function is recognized.

Figure 5:
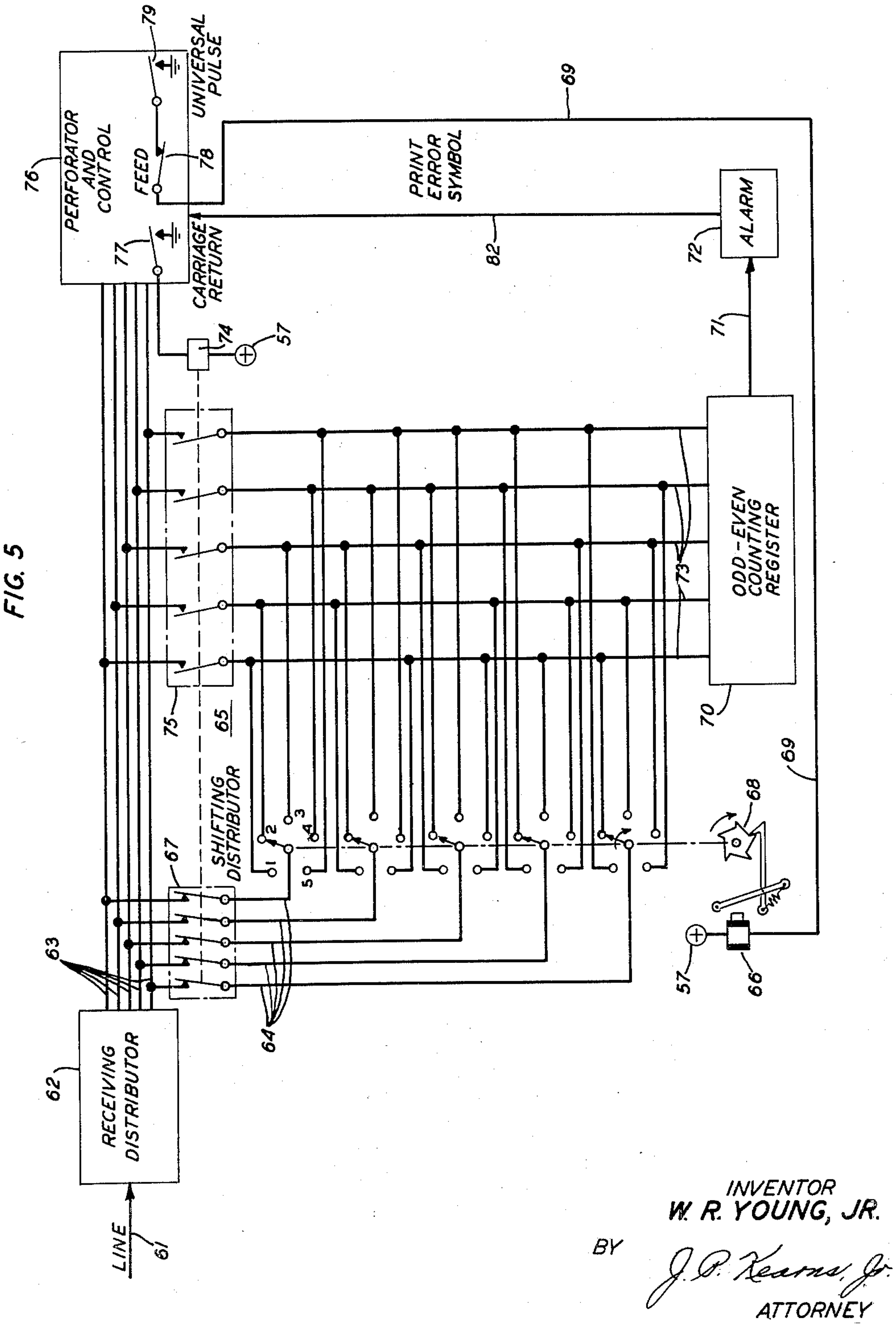
FIG. 5 shows a simplified system in block schematic form for implementing the spiral shift method at the receiving end of a teletypewriter transmission system.

Following the message the check character is transmitted over line 61 to a receiving station which may be partially constituted in its essential aspects in the illustrative embodiment shown in FIG. 5. Here a conventional rotary receiving distributor 62 and perforator 76 are located. Distributor 62 converts the serial code received on line 61 into five-level parallel form in the usual manner and supplies the paralleled output over leads 63 to perforator 76. The latter unit also includes function character recognition equipment, as partially represented by line feed contact 78, universal contact 79, and carriage-return contact 77. Perforator 76 may also be connected to a page printer, if desired.

Auxiliary apparatus required for the practice of the spiral error checking method of this invention is similar to that described in connection with FIG. 4. Leads 64 join the output of distributor 62 to shifting distributor 65, which is substantially identical to distributor 52 shown in FIG. 4. By means of distributor 65 the several code levels are connected in rotation to the input leads 73 for odd-even counting register 70. Counting register 70 is substantially the same as register 54 shown in FIG. 4, and may be constituted of flip-flop circuits of any type well known to the art. The stepping of distributor 65 from one position to another on its five banks of contacts is accomplished by ratchet and pawl mechanism 68, which is operated by linkage under control of relay 66. Magnet 66 is actuated after each message character by the closure of universal contact 79 to ground by way of lead 69 in the manner described in connection with the actuation of magnet 45 in FIG. 4. Distributor 65 is stepped in synchronism with distributor 52 in FIG. 4. The marking impulses corresponding to the message character code elements caused the registration of a cumulative odd-even count in register 70, which will be identical to that of register 54 if there are no errors in transmission.

At the receiving station upon recognition of the carriage-return function character at the end of a line of message text contact 77 closes a path to ground for auxiliary relay 74 and causes the closure of its associated contacts 75. Closure of make contacts 75 connects lines 63 to lines 73 and thereby feeds the check character into register 70. At this time break contacts 67 open to prevent any further registration of marks in register 70. If the transmitted check character matches the count in register 70 all flip-flops therein will be reset and no output will be obtained. However, a failure to reset register 70 may be arranged to produce an output on lead 71 to actuate an alarm indicated diagrammatically by block 72. The alarm may be visual or audible and in addition may be arranged to imprint an error symbol on the message tape or page print by means of an impulse sent over lead 82. Further refinement may include transmitting a prearranged service message to the transmitting station in order to effect a retransmission of a message line in error. Such refinements are believed to be beyond the scope of this invention which is defined by the annexed claims.

Figure 6:
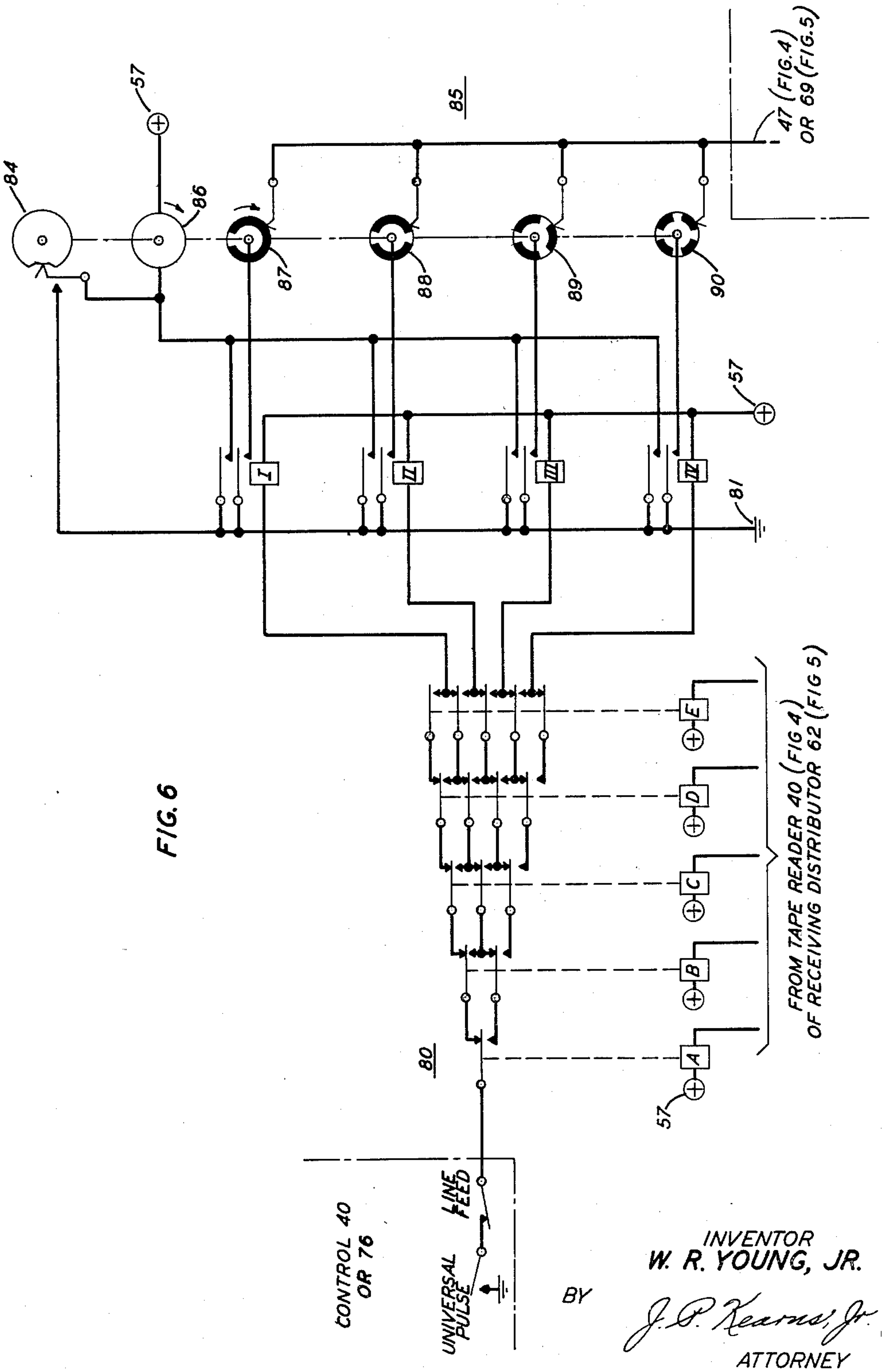
FIG. 6 shows an apparatus for implementing the spiral shift method in a random fashion.

It has been suggested above that a random shifting program, rather than the straightforward spiral shift of a uniform number of levels shown in FIGS. 4 and 5, may yield special advantage in some cases by increasing the statistical probability of detecting all errors in transmission. Accordingly, FIG. 6 shows a practical illustrative embodiment for shifting between characters which depends in a unique way on the number of marking elements in a preceding character. The apparatus of FIG. 6 comprises auxiliary equipment which may be interposed between either the tape reader and control circuit 40 and the shifting magnet 45 in the transmitter of FIG. 4 or the perforator and control 76 and the shifting magnet 66 in FIG. 5.

The apparatus of FIG. 6 comprises a relay tree 80 for counting the number of marks in each character; a set of four relays designated I, II, III and IV which operate individually after each character depending on whether there are one, two, three or four marks in the given character; and a distributor 85 which delivers a number of impulses to the shifting magnets 45 or 66 according to the number of marks counted. The relay tree 80 comprises five marking relays A, B, C, D and E, each of which is connected to an individual code level at the output of the tape reader 40 in FIG. 4 or of the receiving distributor 62 in FIG. 5. Each relay is provided with a spring pile-up as shown in FIG. 6 interconnected so that during the operation of the universal contact 42 or 79 a ground is provided to one or the other of relays I, II, III or IV depending on the number of operated code level relays A, B, C, D or E. Relay tree 80 constitutes a type of selecting array well known in the art. It could be replaced, for example, by a diode matrix, if desired.

Each of the count-registering relays I through IV is provided with a pair of make contacts as shown. The upper contacts are connected in parallel between a ground point 81 and a motor 86. The lower contacts are connected between ground and an associated rotating contact plate driven by motor 86.

Motor 86 is coupled to a group of circular contact plates 87, 88, 89 and 90 and a cam 84. Battery is supplied to motor 86 from source 57. The contact plates 87, 88, 89 and 90 are all provided with insulated portions shown in black and one to four conducting segments, as shown in white. The conductive portions are connected individually to the lower contacts on relays I through IV. Wipers riding the periphery of the respective contact plates are connected in parallel so as to provide an appropriate number of impulses to shifting leads 47 or 69 in FIGS. 4 or 5, respectively.

Immediately following each character universal contact 42 or 79 closes, appropriate ones of marking relays A through E are actuated according to the content of the message character, a count is registered on one of relays I through IV by means of the spring pile-up of relay tree 80, motor 86 makes one revolution, and plates 87 through 90 rotate to deliver an appropriate number of impulses to shifting magnets 45 or 66. Conductive cam 84 rotates and holds ground on motor 86 through one full revolution. In the event of a Blank character having no marks or of a Letters character having five marks the counting registers are not shifted as is apparent from an examination of relay tree 80.

The embodiments of simple apparatus for practicing the spiral shift error-checking method of this invention are intended to be illustrative only. Other and further embodiments may readily be devised by those skilled in the art. However, in an application of E. E. Schwenzfeger bearing Serial No. 815,661, filed May 25, 1959, novel apparatus for practicing this method is disclosed.

What is claimed is:

In a printing telegraph system employing a fixed length permutation code of marking and spacing elements the method of detecting errors in transmission comprising, for each block of message characters the simultaneous performance with message transmission of the repetitive steps of registering cumulatively in response to a start-of-block function character the marking elements on each code level for each message character as an odd-even count, counting once the number of marking elements present in each character, shifting the code levels on which the marking elements in the next succeeding character will be registered with respect to the preceding character in accordance with the number of marking elements counted in the preceding character, and transmitting in response to an end-of-block function character the accumulated odd-even count registered as a check character and stopping further registration; and generating at the receiving end of the system in the same manner a corresponding check character, and comparing the two check characters as an indication of the fidelity of transmission.

References Cited in the file of this patent

UNITED STATES PATENTS

| | | |
|---|---|---|
| 2,700,756 | Estrems | Jan. 25, 1955 |
| 2,849,532 | Hennig | Aug. 26, 1958 |
| 2,862,054 | Curtis | Nov. 25, 1958 |